Patented Aug. 22, 1950

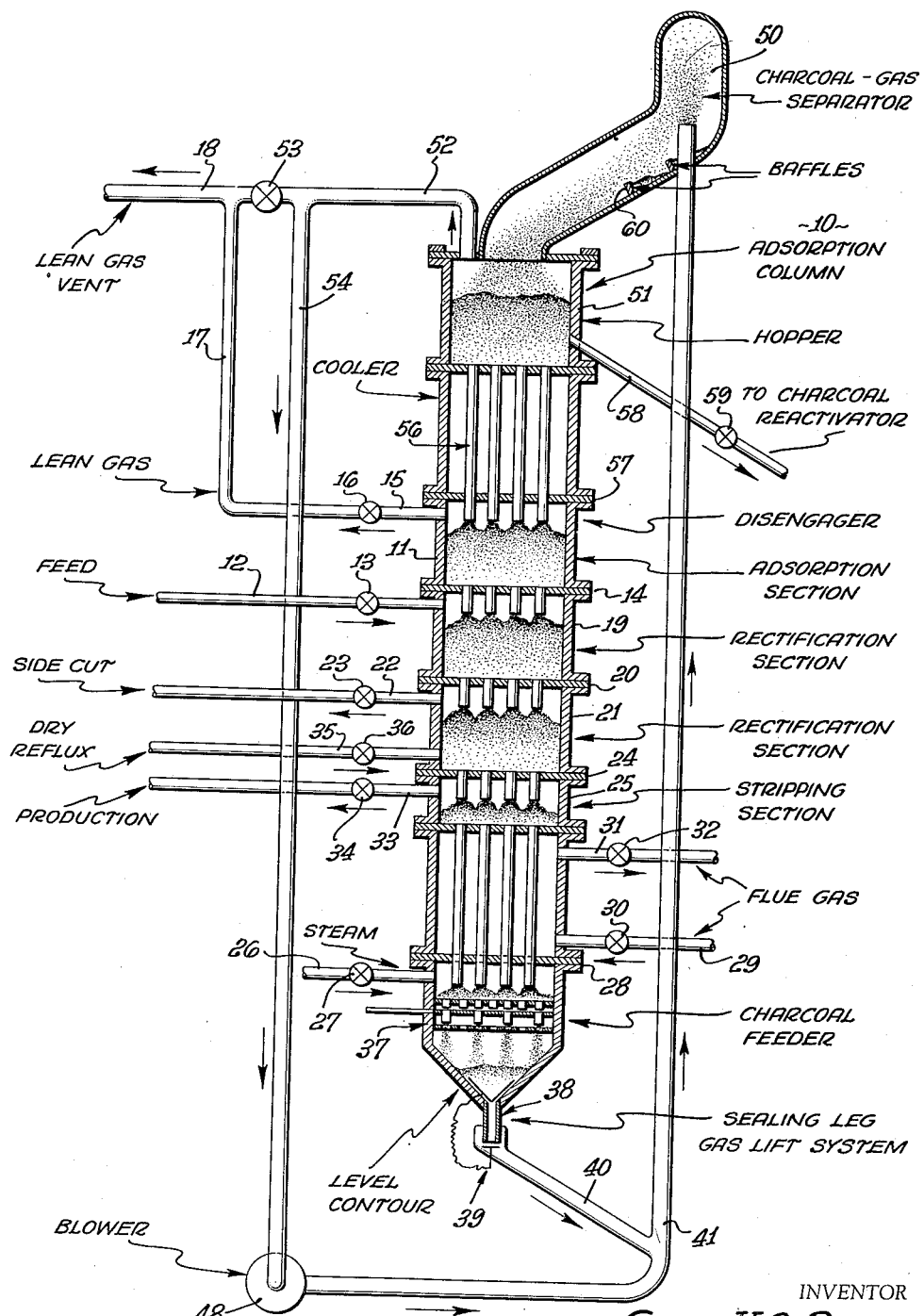

2,519,342

UNITED STATES PATENT OFFICE 2,519,342

ADSORPTION PROCESS

Clyde H. O. Berg, Long Beach, Calif., assignor to Union Oil Company of California, Los Angeles, Calif., a corporation of California Application March 22, 1946, Serial No. 656,476

19 Claims. (Cl. 183—114.2)

This invention relates to the separation of gaseous mixtures by selective adsorption of certain of the components of such mixtures on a solid adsorbent and applies particularly to the separation of normally gaseous hydrocarbons by selective adsorption on granular charcoal.

The separation of gaseous mixtures into constituent components may be accomplished by fractional distillation, solvent extraction, selective adsorption, and similar processes. In so separating gaseous mixtures in which the gaseous components possess low critical temperatures the operational difficulties encountered in liquification thereof render such processes as distillation, liquid-liquid extraction, and the like, economically impracticable. It has been found that such gaseous mixtures may be conveniently separated by the process of selective adsorption on a solid granular adsorbent as more clearly illustrated hereinafter. Among the pertoleum hydrocarbons those compounds of lower molecular weight generally exhibit the lowest critical temperatures and it is these normally gaseous hydrocarbons that are most generally separated by such adsorption process. For example, in a mixture of hydrocarbons of the aliphatic series ranging from methane through ethane, ethylene, propane, propylene, butane, butylene, and even pentanes, separation of such a mixture into its individual constituents is rendered difficult by means of fractional distillation due to exceedingly low temperatures and high pressures necessary to liquefy these gases.

Gaseous mixtures containing valuable hydrocarbons in admixtures with flue gases in large amounts are encountered in many processes, such as for example, the precombustion cracking process for the production of butadiene for use in synthetic rubber, resins, etc. In this process, a hydrocarbon feed stock such as a crude gasoline fraction is cracked by admixture with extremely hot combustion gases. Upon cooling the resulting mixture to atmospheric temperature, and separating the liquid condensate, a gaseous mixture is obtained which contains a large proportion of flue gas admixed with normally gaseous hydrocarbons and some normally liquid hydrocarbons. Modifications of conventional liquid phase adsorption processes can be used to extract the bulk of the normally liquid hydrocarbons and even a large proportion of the $C_4$ hydrocarbons, but it is generally uneconomical to operate at sufficiently high pressures or sufficiently low temperatures to recover any substantial proportion of the $C_2$ and $C_3$ hydrocarbons. Consequently, these hydrocarbons, which may contain a high proportion of potentially valuable olefins, such as ethylene, propylene, acetylene, and the like, are either wasted or employed as low-value fuel gas. The present process is particularly applicable to the separation of normally gaseous mixtures and particularly gaseous mixtures of hydrocarbons containing five carbon atoms or less.

It is known that certain solid adsorbents such as for example activated charcoal or silica gel will adsorb some gases such as water vapor, benzene vapor, butane, and the like, more readily than they will other gases, such as hydrogen, nitrogen, methane, and the like, and that by heating the enriched adsorbent containing the adsorbed gases these gases may be liberated substantially completely and the adsorbents after being cooled again are capable of further selective adsorption. This has lead to the development of various processes for separation of gases involving adsorption on solid adsorbents, heating the enriched adsorbents to liberate the adsorbed gases and cooling the thus regenerated adsorbent for further use. The present invention involves a process of this type which constitutes an improvement over any previous process described in that it affords greater efficiency of separation as well as greater simplicity of operation.

In general, the process of separating gaseous mixtures by selective adsorption on granular charcoal involves the steps of countercurrently adsorbing certain components of the gaseous mixture in a charcoal bed, preferably in a moving bed of charcoal. In a moving bed operation the charcoal, upon which certain of the gaseous components have been adsorbed, flows from the adsorption zone through one or more rectification zones, as hereinafter described, and into a stripping section wherein the adsorbed components are desorbed from the charcoal by means of heat with the aid of a stripping gas such as, for example, steam. The stripped charcoal is subsequently cooled prior to repassage through the adsorption section. In a stationary bed operation the same series of cycles would of necessity be performed, and the same factors would be taken into consideration.

The degree of adsorbability of gases on charcoal or other adsorbents which possess the same properties as charcoal, is generally higher for gases of higher molecular weight. This is found to be particularly true with regard to the hydrocarbon series. Among the non-hydrocarbon gases there appears to be a correlation between adsorbability and critical temperature. Thus, gases of low critical temperature such as hydrogen, nitrogen, oxygen, and carbon monoxide are adsorbed to a lesser degree than gases of comparatively higher critical temperature such as chlorine, sulfur dioxide, hydrogen sulfide, ammonia, nitrous oxide, carbon dioxide, and the like. Thus, the process of selective adsorption may be employed for the separation of hydrocarbon vapors of higher molecular weight from those of lower molecular weight such as, for example, the separation of ethylene from methane, or the like, as well as for the separation of non-hydrocarbon gases of high critical temperature from those of lower critical temperature.

For example, in the conventional process of selective adsorption, a gaseous fraction such as a hydrocarbon fraction is divided into two separate fractions, one enriched in higher molecular weight components and the other enriched in the lower molecular weight components, the former being obtained as the adsorbate from the stripping section and the latter, passing through the adsorption section, being preferentially desorbed by the higher molecular weight components.

Connected with the adsorption of any of these gases there is found to be a temperature rise in the adsorbent bed due to the heat of adsorption of the adsorbed gases. This temperature rise is in most cases undesirable due to the reduced capacity of a given quantity of adsorbent to adsorb gases at higher temperatures.

It is an object of my invention to provide an adsorption process for separating gaseous mixtures wherein the adsorbent exhibits a higher adsorption capacity due to means provided for minimizing the temperature rise within the adsorption system.

It is a further object of my invention to effect the aforementioned increase in efficiency in an improved selective adsorption process whereby a specific fraction or heart cut may be isolated from the gaseous mixture in one adsorption column.

Other objects and advantages will become apparent to those skilled in the art as the description thereof proceeds.

According to the adsorption process of my invention I may employ an adsorption column through which there is maintained a continuous flow of granular charcoal. The adsorption column may consist of a cooling section located in the upper portion thereof, an adsorption section directly beneath the cooling section, one or more rectification sections beneath the adsorption section and a stripping section in the lower portion of the adsorption column. To complete the apparatus means are provided for controlling the rate of flow of the charcoal through the column, for conveying the charcoal from the lower portion of the column back to the top thereof, for introducing the gaseous mixture to be separated into the adsorption section of the column, for removing the various gaseous fractions obtained therein from the column at various points, and for introducing and removing steam into the stripping section.

An apparatus of this nature affords a wide flexibility of operation whereby I may either separate the gaseous fraction into two fractions: one enriched in those gases of lower critical temperature or lower molecular weight, and one enriched in those gases of higher critical temperature or higher molecular weight, or alternatively, by the use of two or more rectification sections located between the adsorption section and the stripping section, I may separate a gaseous mixture into three or more fractions, each of which differs from the other primarily with respect to molecular weight or critical temperature. In the resolution of a normally gaseous hydrocarbon fraction containing $C_1$, $C_2$, $C_3$ and $C_4$ paraffins and $C_2$, $C_3$ and $C_4$ olefins in the conventional selective adsorption process employing a solid adsorbent, it is possible to resolve two components: one enriched in the higher molecular weight hydrocarbons and the other enriched in the lower molecular weight hydrocarbons, the dividing point being a function of the ratio of charcoal and feed stock, charcoal flow rate through the column, and the like.

By the process of my invention I am able to improve upon this type of separation by obtaining, from such a fraction in one adsorption column or in one adsorption operation, a heart cut consisting predominantly of any one or group of components in the feed, the particular component or components in the heart cut being a function of the various operational variables employed. Thus, I may feed to a countercurrent, continuous moving bed, charcoal adsorption column a gaseous mixture as described and obtain as a lean gas from the adsorption zone, methane and any gases of lower critical temperature such as nitrogen, oxygen, and the like and from an intermediate zone a heart cut fraction rich in the $C_2$ hydrocarbons, namely ethane and ethylene, and as the product gas or make gas from the stripping section, the residual hydrocarbons including the $C_3$ and the $C_4$ hydrocarbons. Further, by successive stages more than one side cut may be obtained wherein a second or predominantly $C_3$ fraction could be separated, for example, from the above-mentioned feed.

I have now discovered means whereby the capacity of the adsorbent in any such adsorption operation may be substantially increased. This increased capacity is accomplished, according to my invention, by a modification in the method of operation whereby the temperatures throughout the adsorption column; that is, throughout that portion of the column between the cooling section and the stripping section are substantially reduced. For example, heretofore, in a separation of a gaseous mixture such as one containing methane, ethane, ethylene, and the propane into three fractions each enriched in one of these components the feed mixture has been introduced into the adsorption zone by means of a suitable disengager located in the lower portion thereof. Upon contact of this feed with the charcoal there results a temperature rise due to the heat of adsorption of each of these components which temperature rise appears to be additive in each case.

Thus, if the adsorption of methane induces a temperature rise of 30° F., and the adsorption of ethane and ethylene induces a temperature rise of 30° F. and the adsorption of propane induces a similar temperature rise it is obvious that an increase of some 90° F. will occur within the adsorption zone. I have now discovered means whereby the temperature rise due to the lower molecular weight components within such a mixture may be eliminated. This is accomplished by effecting the saturation of the charcoal within the cooling section, above the adsorption zone, with the lower molecular weight of these components, whereby the temperature rise due to the adsorption of that component occurs within the cooling zone and is subsequently dissipated therein prior to the passage of the charcoal from the cooling zone into the adsorption zone. The principles and modifications of this type of operation will be more readily appreciated by reference to the accompanying drawing.

In the accompanying drawing there is shown in cross section a diagrammatic view of an adsorption apparatus according to my invention.

Referring to the drawing, feed gas, which for the purposes of this description may be considered to be predominantly a mixture of $C_1$, $C_2$ and $C_3$ hydrocarbons including olefins and paraffins is introduced to the adsorption section 11 of adsorption column 10 by means of line 12 controlled by valve 13 and is distributed within the adsorption section 11 by means of disengager 14. A solid bed of granular charcoal is caused to flow downwardly through the adsorption column at such a rate that substantially all of the $C_2$ and heavier hydrocarbons are adsorbed by the charcoal in the adsorption section 11, while methane and lower boiling gases pass upwardly therein. It should be pointed out that the adsorption characteristics of charcoal and similar adsorbents do not prevent the adsorption thereby of a certain quantity of the least readily adsorbable gases in any gaseous mixture contacted with the charcoal. As a possible explanation of this action, it appears that charcoal has a definite adsorptive capacity for each component of a gaseous mixture at a given temperature, which capacity is effected only slightly by the operation pressure. When a given amount of fresh charcoal is contacted with feed gas the charcoal adsorbs all components of the gas to at least a slight degree. Its capacity to adsorb the least readily adsorbable constituents of the gas is soon exceeded, however, and thereafter it will not adsorb further amounts of these constituents but will continue to adsorb the more readily adsorbable components. As it approaches its adsorptive capacity for each more readily adsorbable component, furthermore, there is a definite displacement of the less readily adsorbable material by the more readily adsorbable material. Thus, for feed gas containing $C_1$ to $C_3$ hydrocarbons such as the one presently under discussion, all of the hydrocarbons present therein will be adsorbed to a certain extent by the charcoal. However, the capacity of the charcoal to adsorb methane will be reached prior to the satisfaction of the adsorption capacity for the $C_2$ and $C_3$ hydrocarbons. As more and more of the $C_2$ and $C_3$ hydrocarbons are adsorbed the initially adsorbed methane will be desorbed. Thus, it is erroneous to consider the methane as passing unaffected through the adsorption zone for in reality a certain portion thereof is adsorbed and subsequently desorbed. In the present example, it is the heat of adsorption resulting from the methane adsorption which I propose to eliminate, thereby reducing the overall temperature rise within the adsorption zone.

Returning to the drawing, the methane passing through the adsorption zone has heretofore been substantially completely withdrawn from the column by means of line 15, controlled by valve 16 passing through line 17 into the lean gas vent 18. In my previous application Serial No. 618,346 hereinbefore referred to, it was suggested that a portion of this methane might be advantageously forced through the cooling section countercurrently to the charcoal flow to aid in the drying of the charcoal. I have now found, however, that if the valve 16 or the take-off line 15 is so controlled as to force a substantial portion of the methane to flow through the cooling section that the charcoal within the cooling section becomes saturated with the methane thereby undergoing the temperature rise due to the heat of adsorption of the methane within the cooling section. This temperature rise is subsequently dissipated within the cooling section and the methane saturated charcoal flowing from the cooling section into the adsorption zone is at substantially the same temperature as though no methane had been adsorbed thereon. It is apparent therefrom that upon contacting the methane containing charcoal with the feed gas the only temperature rise which will occur will be as a result of the heat of adsorption of the $C_2$ and $C_3$ hydrocarbons inasmuch as the adsorptive capacity of the charcoal for methane has already been satisfied. In the illustrative example as given above therefor such an operation will reduce the overall temperature rise by some 30° F. or approximately 33⅓% employing such a feed mixture. I have found that this reduction in temperature not only reduces the design difficulties of such a system, but also materially increases the adsorptive capacity of the adsorbent.

The saturated charcoal passes from adsorption section 11 through disengager 14 into rectification section 19 wherein equilibrium is established between small amounts of methane and lighter gases which may have been retained on the charcoal and the $C_2$ and heavier hydrocarbons by refluxing the charcoal with $C_2$ hydrocarbons which are released from the charcoal at a point lower in the column. Thus in rectification section 19 any residual methane or lighter gases which may have been adsorbed on the charcoal passing downwardly through disengager 14 are desorbed by virtue of the selective adsorption of the $C_2$ hydrocarbons which are caused to pass upwardly through disengaging section 20 into rectification section 19. The charcoal substantially free of such lighter components passes from rectification section 19 through disengaging section 20 into a secondary rectification section 21. In rectification section 21 the charcoal is refluxed with the heavier components of the feed, i. e., $C_3$ and any higher molecular weight hydrocarbons which may have been present in the feed mixture to effect the desorption of the $C_2$ hydrocarbons, the level of this reflux being controlled at a given point within the rectification section by means of a temperature control point within the section to measure the heat of adsorption of the $C_3$ hydrocarbons and to control the reflux inlet valve accordingly. By injecting or otherwise introducing the $C_3$ hydrocarbons into the rectification section 21 to serve as reflux therein the $C_2$ hydrocarbons are desorbed due to the preferential adsorption of the heavier hydrocarbons and the desorbed $C_2$ hydrocarbons migrate upwardly in the section insuring thereby the continued retention on the charcoal, flowing downwardly from rectification section 19, of the heavier components. In this manner a $C_2$ heart cut may be withdrawn from the top of rectification section 21 by means of line 22 controlled by valve 23 which is comparatively free of either lighter or heavier components.

To further insure the production of a side cut containing a minimum of lighter components as impurities, valve 23 is so controlled that a portion of the $C_2$ hydrocarbons desorbed in the second rectification section 21 are forced to pass upwardly through disengaging section 20 into the initial rectification section 19 furnishing reflux therein for the down flowing charcoal to insure a substantially complete removal of the methane and lighter gases.

The charcoal substantially free of $C_2$ hydrocarbons and lighter gases passes from rectification section 21 through disengager 24 into the steam stripping section 25. In this section steam is introduced at disengager 28 by means of line 26 controlled by valve 27 and flows upwardly through a heated tube bundle to the stripping sections. The tube bundle may be heated by means of hot combustion gases or the like which are introduced by means of line 29, controlled by valve 30 and withdrawn from the tubular heater by means of line 31 controlled by valve 32. In this section the $C_3$ and heavier hydrocarbons and any residual $C_2$ or lighter gases which may be still adsorbed on the charcoal are stripped from the charcoal together with the steam and are withdrawn by means of line 33 controlled by valve 34.

It should be pointed out that the majority of the stripping is actually accomplished in that part of the stripping section which lies above the tube bundle charcoal heater and as a result the actual stripping temperatures are considerably lower than the temperature to which the charcoal is heated in the tubular heater. Thus the amount of polymerization or other undesirable reactions which might take place at the higher temperature is minimized. If the stripped components are dried prior to use as reflux in the column higher steam rates may be employed whereby the temperatures may be reduced even farther with no sacrifice in efficiency of the stripping. Thus, the higher the stream rates permissible on the basis of the adsorption column design the lower will be the necessary stripping temperature and the less polymerization of any olefins or diolefins that may be in the stripped components will occur. This will result in longer charcoal life before reactivation becomes necessary. These $C_3$ and heavier hydrocarbons employed as reflux are dried by condensation of the steam and separation thereof from the hydrocarbons and are reintroduced in the adsorption column at a point in rectification section 21 directly above disengager 24 by means of line 35 controlled by valve 36 to serve therein as reflux.

The charcoal passing through the disengaging section 24 passes through the stripping section 25 as described, through the heated tube bundle into the lower portion of the adsorption column. It is at this point that the rate of flow of the charcoal through the column is most conveniently controlled. Any desired means of controlling this flow may be employed such as a rotating vane or the apportioning means as shown, or the like.

The charcoal passes through the feeder 37 into the sealing leg 38, the length of which is dependent upon the type of feeder or flow regulator employed. In the drawing, a level control 39 is shown whereby the length of the sealing leg may be kept at a minimum by virtue of the fact that a build up of charcoal is induced in the bottom of the adsorption column creating thereby the necessary pressure seal. The charcoal is released by the level control 39 flowing through transfer line 40 into the charcoal gas lift system 41.

The charcoal flowing through transfer line 40 is picked up by the gaseous conveying medium forced through the gas lift system 41 by means of blower 48, carried to the top of the adsorption column where it is discharged into the charcoal gas separator 50 falling therefrom into hopper 51. A major portion of the charcoal in hopper 51 passes through the cooler 56 wherein it is cooled to the desired temperature after saturation thereof with methane as hereinbefore described and is passed through disengager 57 into the adsorption section 11. Line 58, controlled by valve 59, is shown whereby charcoal may be withdrawn from hopper 51 when desired to be reactivated for reuse in the process. The gaseous media used as a mean of gas drive in a charcoal lift system is separated from the charcoal in the charcoal gas separator 50 and is discharged from the hopper 51 by means of line 52 whereafter it may be recycled to the blower 48 by means of line 54. Excess gas may be vented from the system through valve 53 and line 18, the amount thereof depending upon the flow of methane through the cooling section into the hopper.

Many modifications in the operation and in the design of the adsorption unit may be employed without departing from the present invention which comprises an innovation in the art of selective adsorption whereby the temperatures within the adsorption column may be appreciably reduced thereby permitting the realization of increased capacity. Thus it may be desirable to split the operation separating the processes of adsorption and stripping into two separate columns wherein a heart cut may be obtained in the first column by means of introducing the heavier components obtained in a secondary or stripping column as reflux to effect the desorption of the intermediate components as described above. Again it may be preferable to remove the steam or other stripping gas which may be employed from the heavier components, stripped from the charcoal, prior to using a portion of these as the necessary reflux to obtain the heart cut. Such a separate stripping operation would be of advantage primarily in that a reduction in the required charcoal circulation rate would be affected due to the decrease in the charcoal temperature in the lower rectification zone. The stripping function may also be modified by providing in the adsorption column, directly below the tubular stripping section, a non-restricted stripping section. In such instance comparatively higher steam rates may be employed in this non-restricted section, reducing thereby the temperature in the stripping zone. Advantages of this type of operation include lower total heat requirements, lower construction costs as a result of the reduction of the heating and cooling costs and of the rate of charcoal circulation, and more accurate control of temperature conditions within the various sections of the column relating to the adsorption and desorption of the gases.

Another modification of the adsorption process which may be employed without departure from the principles of the present invention is the use of a charcoal elevator in place of the gas lift system as shown. In such an elevator system the charcoal is discharged from transfer line 40 directly into the buckets of a continuous elevator and is carried therefrom to a point above the top of the adsorption column and is discharged into the hopper 51. In the event that an elevator system such as this is employed it is still necessary to provide means for gas outlet from the hopper 51 such as line 52 for the excess gases passing through the cooling section. These and other variations may be employed in the adsorption plant in which the process and apparatus of my invention is employed.

In an alternative method of furnishing heavy hydrocarbon reflux to rectification section 21 the take-off valve 34 in line 33 may be so controlled as to force a portion of the products from the stripping section; i. e., steam and hydrocarbons, predominantly $C_3$ hydrocarobns, countercurrently to the charcoal flow through disengager 24 into the rectification section. There are, however, certain inherent disadvantages to this, what might be termed, "direct return reflux" paramount among which are the dilution of the hydrocarbons, which give the most efficient refluxing action, by the steam and moistening of the charcoal by a partial condensation of the steam, which latter occurrence has the effect of impeding the free flow of the charcoal through the tubes in disengager 24 due to the tendency of the charcoal particles to adhere to each other or agglomerate when they become wet.

For these reasons I have found that decidedly improved results could be obtained by removing the entire production from the stripping section, thus preventing any substantial flow back through disengager 24, separating the stripping steam from the hydrocarbon gases and returning a portion of the latter, as substantially dry reflux, to the lower portion of rectification section 21. This dry reflux return as represented in the drawing by line 35 controlled by valve 36 may be made in any desired manner such as by means of a spider located in the lower part of rectification section 21 slightly above the disengaging section 24 or by a separate disengaging section separated from disengaging section 24 by a distance sufficient to permit the build up of a sufficient head of charcoal to prevent excessive leakage of the wet stripped gases from the stripping section through disengager 24. These particular methods of reintroduction of the dry reflux are only illustrative of possible modes of operation and should not be construed as limiting the present invention in any of its aspects.

The efficiency of this side cutting may be more fully appreciated by reference to the following specific example:

EXAMPLE

In one example of the process of the present invention an ethylene-ethane fraction was obtained from dry gas produced from a catalytic cracking operation. This separation or heart cut was obtained in one adsorption column as described rather than in a two-stage operation as has been heretofore necessary.

The feed to the unit contained approximately 35% methane, 40% ethylene, 8.2% ethane, 14.5% propylene-propane and traces of other gases including $C_4$ hydrocarbons, nitrogen and carbon dioxide. (All percentages herein refer to mol per cent.) Approximately 7,000 SCF (standard cubic feet) per day of this feed gas was charged to the adsorption section of the unit and the charcoal flow was maintained at 1,150 pounds per MSCF of feed per day. Approximately 2,470 SCF per day of lean gas was produced from the adsorption section and from the lean gas take off in the charcoal hopper, approximately 3,260 SCF of heart cut was produced from the secondary rectification section and approximately 1,240 SCF of make gas was obtained from the stripping section. The compositions of these three streams are given in the table below:

Table

[Composition—Mol per cent of gas.]

| Constituents | Feed | Lean Gas | Heart Cut | Make Gas |
|---|---|---|---|---|
| Methane | 34.9 | 94.0 | 1.3 | 2.0 |
| Ethylene | 40.0 | 1.4 | 76.1 | 4.3 |
| Ethane | 8.2 | | 13.7 | 1.1 |
| Propane-Propylene | 14.5 | 0.1 | 5.8 | 91.1 |

By carrying out this adsorption in accordance with the principles herein set forth; viz., by causing a sufficient quantity of the methane and lighter gases to flow into the cooler and saturate the charcoal therein, increased efficiency was obtained. Thus the adsorption of the methane in this fraction causes a temperature rise in the charcoal bed of approximately 26° F. By causing this temperature rise to take place in the cooling section and subsequently dissipating the same therein the capacity of the charcoal is thereby increased as a result of the attendant reduction in temperatures throughout the remainder of the adsorption column.

The methane in this example is illustrative of the lower molecular weight fraction as hereinbefore described, but is not intended to constitute a limitation of the invention. For example, if the feed gas consists of hydrocarbons in the $C_2$ to $C_4$ range and it is desired to separate therefrom, in the adsorption section, the $C_2$ hydrocarbons, these may be classed as the lower molecular weight fraction in accordance with the terminology employed herein. Similarly if the feed gas consists of $C_1$ to $C_4$ hydrocarbons and it is desired to separate a $C_1$ to $C_2$ fraction from the feed in the adsorption section, this $C_1$ to $C_2$ fraction is considered to be the lower molecular weight fraction. Equivalent usage is employed in the separation of non-hydrocarbon gases wherein the fractions are denominated according to their critical temperature rather than molecular weight.

From the data of the example it is apparent that by the process of my invention I am able, when separating a feed such as that described, to obtain a heart cut therefrom containing approximately 90 mol per cent of an ethane-ethylene fraction. Further, if appreciable butanes and butylenes were present in the feed together with methane, ethane, ethylene, propane and propylene the operation of the column could be controlled so as to obtain a heart cut rich in either the $C_2$ or the $C_3$ hydrocarbons as desired. Also by including a third rectification section in a column as described, separated from the other two by a disengaging section, and provided with gas take off means, a second heart cut may be obtained so that both the $C_2$ and $C_3$ fractions may be isolated from the feed gases.

The charcoal employed in the above process is preferably granular, about 10 to 14 mesh, although sizes as large as about 4 mesh and as small as about 100 mesh may also be employed. By "charcoal" herein is meant any carbon, animal or vegetable charcoal, or the like, although an activated form of carbon or charcoal is preferred. After long usage, small amounts of highly adsorbable materials may accumulate in the charcoal and impair its efficiency somewhat. The charcoal may then be withdrawn as provided in Figure 1 by means of line 58 from hopper 51 and may be reactivated by high temperature steam treatment.

The process of this invention may be employed for the separation of any mixture of gases, containing two components one of which is more readily adsorbable on the adsorbent than the other, into fractions, the fraction richer in the more readily adsorbable component being termed the "make gas," and the fraction in the less readily adsorbable component being termed the "lean gas." Further, if the feed gas comprises three or more components an intermediate fraction of "heart cut" may be obtained.

There are many modifications of the above process which may be employed. Although granular charcoal of about 10 to 40 mesh is preferred, larger granules up to about 2 mesh may be employed in some instances, and finely ground or powdered charcoal of particle size as small as about 500 mesh may also be employed. When using the powdered charcoal, however, care must be exercised in the design of sealing legs, separators, etc. The use of finely powdered charcoal lends itself well to concurrent flow of stripping gas and charcoal, which is another modification applicable also to granular charcoal. When concurrent flow of stripping gas and charcoal is employed, especially with finely ground charcoal, the stripping may be accomplished by lifting the charcoal to a separator located at the top of a cooler while heating it at the same time. In another modification, the stripping gas may be sufficiently preheated to supply the bulk or all of the necessary stripping heat.

It is to be understood that the selective adsorption process as herein set forth is not limited in its scope to the particular gaseous mixtures employed in the description and illustration and further that the principle of temperature reduction throughout the adsorption column by means of presaturation and cooling of the charcoal is not limited to an adsorption process in which it is desired to obtain a heart cut. Thus, in the first case I may employ this adsorption process for the separation of any normally gaseous materials into two or more fractions each of which are enriched in certain components of the gaseous mixture. I have found, as hereinbefore set forth that charcoal or similar adsorbents exhibit a preferential adsorption for the gases of higher critical temperature which relationship among the gases of the hydrocarbon series appears to be more clearly related to the molecular weight thereof. It is, therefore, within the scope of the invention to separate any gases of differing critical temperature or any hydrocarbon gases of differing molecular weight. I have found that the selective adsorption processes herein defined is particularly effective for the separation of an ethylene rich fraction from a mixture of low molecular weight hydrocarbon gases. Thus, from a gaseous mixture comprising methane, ethane, ethylene, propane, propylene, which mixture may or may not contain higher molecular weight hydrocarbon or gaseous impurities such as hydrogen, carbon dioxide, or the like, and ethylene rich heart cut may be obtained in an operation substantially similar to that described with reference to the drawing and illustrated in the example.

In any event the present invention is an aid to the operation of the adsorption process. Thus by presaturating the adsorbent with those components of the gaseous mixture which are the least readily adsorbed by the adsorbent and subsequently dissipating the heat generated in this presaturation, the subsequent adsorption and rectification of those gases of the gaseous mixture which are more readily adsorbed occurs at lower temperatures. The distinction between the least readily adsorbed gases and the more readily adsorbed gases resides in the various operational variables whereby it is determined in each particular case which are the gases to be adsorbed and which are the gases to be recovered from the charcoal in the adsorption section. For example, in a $C_1$ to $C_4$ hydrocarbon fraction if it is desired to adsorb only the $C_3$ and $C_4$ hydrocarbons, the $C_1$ and $C_2$ hydrocarbons become those least readily adsorbed and any or all of these may be employed to presaturate the adsorbent. On the other hand if it is desired to adsorb the $C_2$ to $C_4$ hydrocarbons, the $C_1$ hydrocarbon becomes the one least readily adsorbed and will thus be the only one employed to presaturate the adsorbent. The same principles apply regardless of the gaseous mixture to be separated and this particular example should not be construed as limiting the process.

Further, it is to be understood that the improvements in such a process resulting from the reduced operating temperatures made possible by the method herein set forth are of equal advantage in any selective adsorptive process whether it is desired to separate the gaseous mixture into only two fractions or, by the use of the heart cutting technique herein set forth, into three or more fractions.

Having described and illustrated my invention and realizing that many modifications thereof will occur to those skilled in the art without departing from the spirit or scope of the foregoing specification or of the following claims, I claim:

1. A method of recovering a gaseous component of higher critical temperature by selective adsorption on a solid adsorbent from a gaseous mixture containing said gaseous component of higher critical temperature together with a gaseous component of lower critical temperature, which comprises the steps of adsorbing said gaseous component of lower critical temperature on said adsorbent prior to contacting said adsorbent with said gaseous mixture and dissipating the heat created by said adsorption prior to contacting said adsorbent with said gaseous mixture.

2. A method of recovering a higher molecular weight hydrocarbon by selective adsorption on a solid adsorbent from a hydrocarbon mixture containing said higher molecular weight hydrocarbon together with a lower molecular weight hydrocarbon, which comprises the steps of adsorbing said lower molecular weight hydrocarbon on said adsorbent and dissipating the heat evolved in said adsorbing step prior to contacting said adsorbent with said hydrocarbon mixture.

3. A method according to claim 1 in which the solid adsorbent is charcoal.

4. A method according to claim 2 in which the solid adsorbent is charcoal.

5. A process for separating a gaseous mixture containing gases of differing critical temperatures into fractions of substantially different critical temperatures which comprises contacting a stripped solid adsorbent with the gases of a lower critical temperature and dissipating the heat generated by said contacting in a cooling zone, contacting said gaseous mixture with the resulting solid adsorbent in an adsorption zone to cause adsorption of the gases of higher critical temperature while desorbing the gases of lower critical temperature, separating said gases of lower critical temperature from said solid adsorbent containing said gases of higher critical temperature, passing said solid adsorbent containing said gases of higher critical temperature through a rectification zone into a stripping zone, stripping said gases of higher critical temperature from said solid adsorbent in said stripping zone, returning stripped solid adsorbent to said cooling zone and returning a portion of said stripped gases of higher critical temperature to said rectification zone.

6. A process for separating a gaseous mixture containing gases of differing critical temperatures into at least three fractions, a primary fraction containing the gases of lower critical temperature, a secondary fraction containing gases of intermediate critical temperature and a tertiary fraction containing gases of higher critical temperatures which comprises contacting a solid adsorbent with said primary fraction of said gaseous mixture, dissipating the heat evolved from said contacting, contacting said gaseous mixture with said solid adsorbent to cause adsorption of said secondary and tertiary fractions of said gaseous mixture and desorption of said primary fraction of said gaseous mixture, separating said primary fraction from said solid adsorbent containing said secondary and said tertiary fraction, passing said solid adsorbent containing said secondary and tertiary fractions through a rectification zone into a stripping zone, stripping said tertiary fraction from said solid adsorbent in said stripping zone, returning a portion of said stripped tertiary fraction to said rectification zone to effect desorption of said secondary fraction from said solid adsorbent in said rectification zone, separating said secondary fraction from said solid adsorbent in said rectification zone and separating said tertiary fraction from said stripped solid adsorbent in said stripping zone.

7. A process for separating a gaseous hydrocarbon mixture containing hydrocarbon gases of differing molecular weight which comprises contacting a solid adsorbent with a portion of said gaseous mixture said portion containing gaseous hydrocarbons of lower molecular weights, dissipating the heat evolved in said contacting, contacting said gaseous mixture with said solid adsorbent to cause adsorption of gases of higher molecular weight while desorbing said gases of lower molecular weight, separating said gases of lower molecular weight from said solid adsorbent containing said gases of higher molecular weight, passing said solid adsorbent containing said gases of higher molecular weight through a rectification zone into a stripping zone, stripping said gases of higher molecular weight from said solid adsorbent in said stripping zone and returning a portion of said stripped gases of higher molecular weight to said rectification zone.

8. A process for separating a gaseous hydrocarbon mixture containing gases of differing molecular weights into at least three fractions, a primary fraction containing the gases of lower molecular weight, the secondary fraction containing gases of intermediate molecular weight and a tertiary fraction containing gases of higher molecular weight, which comprises contacting a solid adsorbent with said primary fraction of said gaseous mixture, dissipating the heat evolved from said contacting, contacting said gaseous mixture with said solid adsorbent to cause adsorption of said secondary and tertiary fractions of said gaseous mixture and desorption of said primary fraction of said gaseous mixture, separating said primary fraction from said solid adsorbent containing said secondary and said tertiary fraction, passing said solid adsorbent containing said secondary and tertiary fractions through a rectification zone into a stripping zone, stripping said tertiary fraction from said solid adsorbent in said stripping zone, returning a portion of said stripped tertiary fraction to said rectification zone to effect desorption of said secondary fraction from said solid adsorbent in said rectification zone, separating said secondary fraction from said solid adsorbent in said rectification zone and separating said tertiary fraction from said stripped solid adsorbent in said stripping zone.

9. A process for separating a gaseous mixture containing gases of differing critical temperatures which comprises contacting said gaseous mixture with a solid adsorbent to cause adsorption of gases of higher critical temperature while leaving gases of lower critical temperatures as unadsorbed gases, causing said gases of lower critical temperature to pass countercurrently to said solid adsorbent so as to effect the saturation of said solid adsorbent with said gases of lower critical temperature at a point prior to the point of contact of said gaseous mixture with said solid adsorbent, dissipating the heat of adsorption of said gases of lower critical temperature, separating said gases of lower critical temperature desorbed by said gases of higher critical temperature from said solid adsorbent, passing said adsorbent containing said gases of higher critical temperature through a rectification zone into a stripping zone, stripping said gases of higher critical temperature from said solid adsorbent in said stripping zone and returning a portion of such stripped gases of higher critical temperature to said rectification zone.

10. A process for separting a gaseous mixture containing gases of differing critical temperatures into at least three fractions, a primary fraction containing the gases of lower critical temperature, a secondary fraction containing gases of intermediate critical temperature and a tertiary fraction containing gases of higher critical temperature which comprises contacting said gaseous mixture with a solid adsorbent to cause adsorption of said secondary and said tertiary fractions while leaving said primary fraction as an unadsorbed fraction, causing said primary fraction to pass countercurrently to said solid adsorbent so as to effect the saturation of said solid adsorbent with said primary fraction at a point prior to the point of contact of said gaseous mixture with said solid adsorbent, dissipating the heat of adsorption of said primary fraction at a point prior to the point of contact of said gaseous mixture with said solid adsorbent, separating said primary fraction from said solid adsorbent containing said secondary and said tertiary fraction, passing said solid adsorbent containing said secondary and tertiary fractions through a rectification zone into a stripping zone, stripping said tertiary fraction from said solid adsorbent in said stripping zone, returning a portion of said stripped tertiary fraction to said rectification zone to effect desorption of said secondary fraction from said solid adsorbent in said rectification zone, separting said secondary fraction from said solid adsorbent in said rectification zone and separating said tertiary fraction from said stripped solid adsorbent in said stripping zone.

11. A process for separating a gaseous hydrocarbon mixture containing gases of differing molecular weight which comprises contacting said gaseous hydrocarbon mixture with a solid adsorbent to cause adsorption of gases of higher molecular weight while leaving gases of lower molecular weight as unadsorbed gases, causing said gases of lower molecular weight to pass countercurrently to said solid adsorbent so as to effect the saturation of said solid adsorbent with said gases of lower molecular weight at a point prior to the point of contact of said gaseous hydrocarbon mixture with said solid adsorbent, dissipating the heat of adsorption of said gases of lower molecular weight, separating said gases of lower molecular weight desorbed by said gases of higher molecular weight from said solid adsorbent, passing said adsorbent containing said gases of higher molecular weight through a rectification zone into a stripping zone, stripping said gases of higher molecular weight from said solid adsorbent in said stripping zone and returning a portion of such stripped gases of higher molecular weight to said rectification zone.

12. A process for separating a gaseous hydrocarbon mixture containing gases of differing molecular weight into at least three fractions, a primary fraction containing the gases of lower molecular weight, a secondary fraction containing gases of intermediate molecular weight and a tertiary fraction containing gases of higher molecular weight which comprises contacting said gaseous hydrocarbon mixture with a solid adsorbent to cause adsorption of said secondary and said tertiary fractions while leaving said primary fraction as an unadsorbable fraction, causing said primary fraction to pass countercurrently to said solid adsorbent so as to effect the saturation of said solid adsorbent with said primary fraction at a point prior to the point of contact of said gaseous hydrocarbon mixture with said solid adsorbent, dissipating the heat of adsorption of said primary fraction at a point prior to the point of contact of said gaseous hydrocarbon mixture with said solid adsorbent, separating said primary fraction from said solid adsorbent containing said secondary and said tertiary fraction, passing said solid adsorbent containing said secondary and tertiary fractions through a rectification zone into a stripping zone, stripping said tertiary fraction from said solid adsorbent in said stripping zone, returning a portion of said stripped tertiary fraction to said rectification zone to effect desorption of said secondary fraction from said adsorbent in said rectification zone, separating said secondary fraction from said adsorbent in said rectification zone and separating said tertiary fraction from said stripped solid adsorbent in said stripping zone.

13. A process according to claim 5 in which the solid adsorbent is charcoal.

14. A process according to claim 6 in which the solid adsorbent is charcoal.

15. A process according to claim 7 in which the solid adsorbent is charcoal.

16. A process according to claim 8 in which the solid adsorbent is charcoal.

17. A process according to claim 5 in which the stripping is accomplished by heating and contacting the solid adsorbent with steam, and the contacting of the stripped adsorbent with gases of lower critical temperature in the cooling zone is countercurrent so as to also aid in drying the adsorbent.

18. A process for separating a gaseous mixture containing gases of differing critical temperatures into fractions of substantially different critical temperatures which comprises allowing a solid adsorbent to flow downward by gravity in a solid moving bed through a cooling zone, an adsorption zone and a stripping zone successively, countercurrently contacting stripped solid adsorbent with the gases of lower critical temperature and dissipating the heat generated by said contacting in a cooling zone, countercurrently contacting said gaseous mixture with the resulting solid adsorbent in an adsorption zone to cause adsorption of the gases of higher critical temperature while desorbing the gases of lower critical temperature, separating said gases of lower critical temperature from said solid adsorbent containing said gases of higher critical temperature, passing said solid adsorbent containing said gases of higher critical temperature through a rectification zone into a stripping zone, stripping said gases of higher critical temperature from said solid adsorbent in said stripping zone by the use of countercurrent contacting with a stripping gas, returning stripped solid adsorbent to said cooling zone and returning a portion of said stripped gases of higher critical temperature to said rectification zone.

19. A process according to claim 18 in which the stripping gas is steam.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,617,960 | Muller | Feb. 15, 1927 |
| 1,784,536 | Pantenburg | Dec. 9, 1930 |
| 1,825,707 | Wagner | Oct. 6, 1931 |
| 1,836,301 | Bechthold | Dec. 15, 1931 |
| 2,384,311 | Kearby | Sept. 4, 1945 |